(12) United States Patent
Vanden Berghe et al.

(10) Patent No.: US 7,974,407 B2
(45) Date of Patent: *Jul. 5, 2011

(54) PRIVACY ENHANCED COMPARISON OF DATA SETS

(75) Inventors: Chris P Vanden Berghe, Hong Kong (HK); Tadeusz J Pietraszek, Rueschlikon (CH); Jan Leonhard Camenisch, Thalwill (CH); Dieter Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/055,369

(22) Filed: Mar. 26, 2008

(65) Prior Publication Data

US 2008/0310621 A1  Dec. 18, 2008

Related U.S. Application Data

(63) Continuation of application No. 11/946,933, filed on Nov. 29, 2007.

(30) Foreign Application Priority Data

Dec. 8, 2006  (EP) .................................. 06125720

(51) Int. Cl.
*G06F 21/00* (2006.01)
(52) U.S. Cl. ............................ 380/28; 707/687; 707/698

(58) Field of Classification Search ................. 707/687, 707/697, 698, 699
See application file for complete search history.

(56) References Cited

U.S. PATENT DOCUMENTS

| | | | | |
|---|---|---|---|---|
| 7,054,891 B2 * | 5/2006 | Cole | | 707/699 |
| 7,698,250 B2 * | 4/2010 | Dwork et al. | | 707/687 |
| 7,734,598 B2 * | 6/2010 | Noguchi et al. | | 707/690 |
| 7,747,582 B1 * | 6/2010 | Kaminski, Jr. | | 707/687 |
| 2004/0148506 A1 * | 7/2004 | Prince | | 713/176 |
| 2009/0193249 A1 * | 7/2009 | Conrado et al. | | 713/156 |

OTHER PUBLICATIONS

PCT Search Report PCT/IB2007/054449 Mailed Jun. 2, 2008.
Rakesh Agrawal et al.; "Information Sharing Across Private Databases;" SIGMOND 2003, Jun. 9-12, 2003; pp. 86-97.

* cited by examiner

*Primary Examiner* — Matthew B Smithers
(74) *Attorney, Agent, or Firm* — Cantor Colburn LLP

(57) ABSTRACT

A computer implemented method for performing a privacy enhanced comparison of a plurality of data sets includes allocating a private encryption key to each of the data sets; performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and comparing the commutatively encrypted data sets.

24 Claims, 12 Drawing Sheets

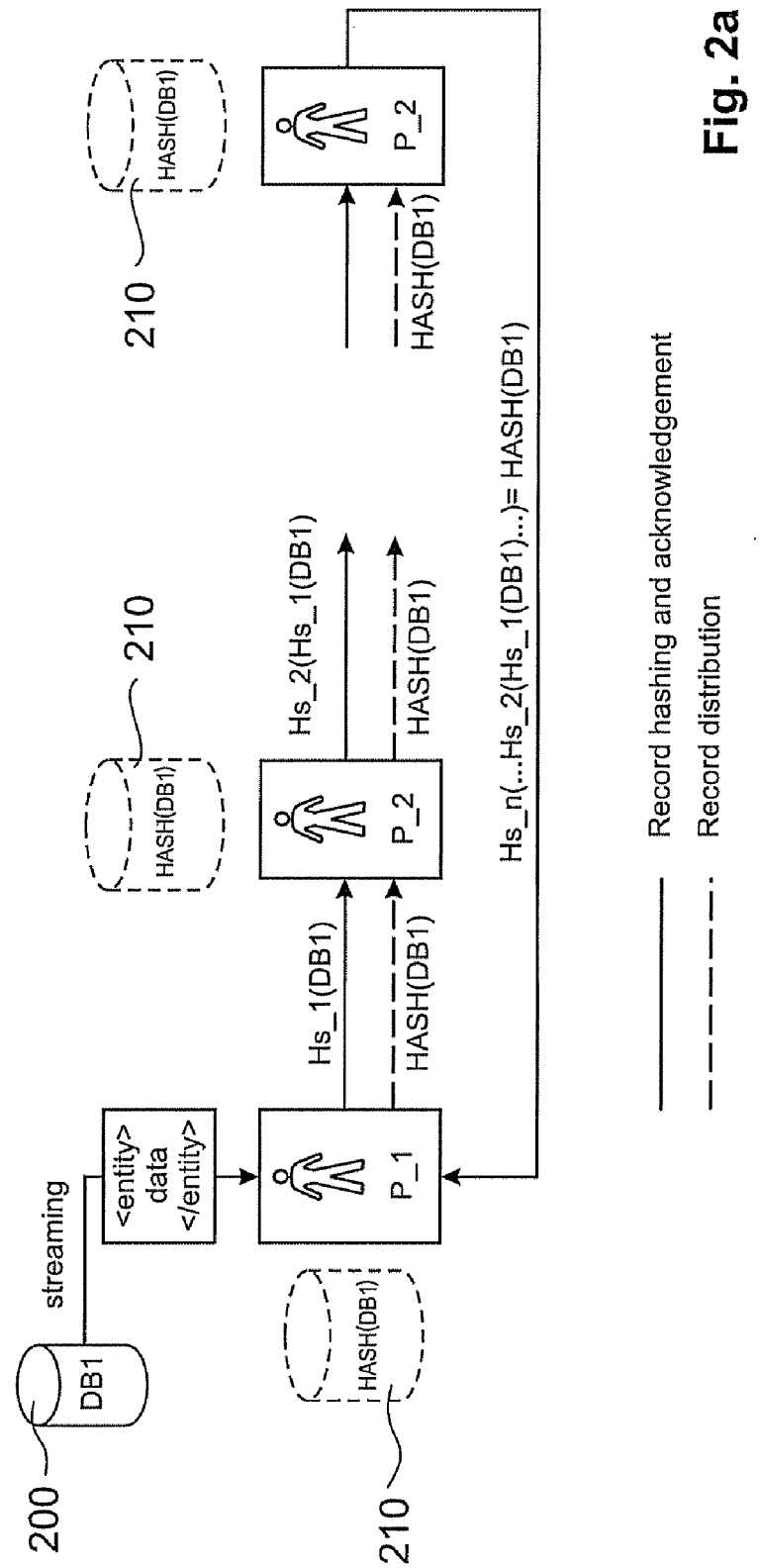

601

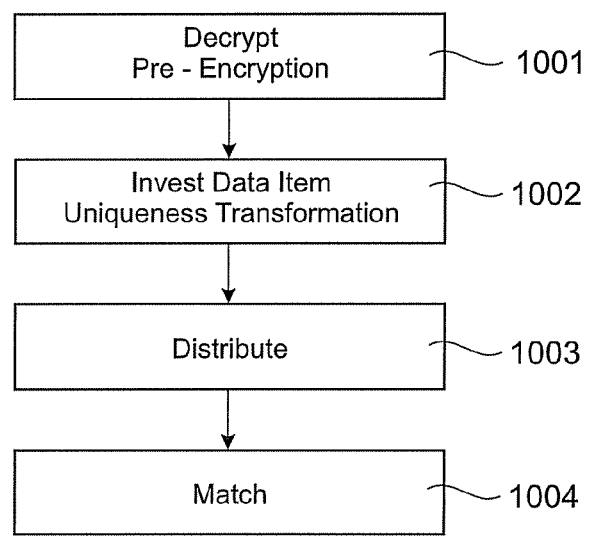
Fig. 10          603

PRIVACY ENHANCED COMPARISON OF DATA SETS

This application is a continuation application of U.S. Ser. No. 11/946,933 filed Nov. 29, 2007, which claims priority to European Patent Application No. 06125720.0, filed 8 Dec. 2006, and all the benefits accruing therefrom under 35 U.S.C. §119, the contents of which in its entirety are herein incorporated by reference.

TECHNICAL FIELD

The present invention is related to methods, a computer system and a computer program for privacy enhanced comparison of data sets.

BACKGROUND OF THE INVENTION

Various parties (e.g., corporations, governmental agencies and natural persons) face a common dilemma: how can parties share specific information (e.g., health care data, customer prospect lists, an adversary watch list, a black list or a list of actual or potential problematic entities) that can assist the parties via business optimization, improved analysis, or detecting the presence of potential adversary or other problematic parties, while maintaining the security and confidentiality of such information.

Hesitation to contribute or otherwise disclose, as well as laws governing the use and disclosure of certain information is predicated upon a concern that the information may be subjected to unintended disclosure or used in a manner that may violate privacy policies or otherwise cause damage to the party. Such damage may include identity theft, unauthorized direct marketing activities, unauthorized or intrusive governmental activities, anti-competitive practices, defamation, credit damage, or economic damage.

Conventional systems use various means to transfer data in a relatively confidential manner within or between parties. Although this technology has proven to be useful, it would be desirable to present additional improvements. For example, some conventional systems use a reversible encryption method, which modifies the data to engender some level of confidentiality. The encrypted data is transmitted to a recipient, who uses a comparable decryption method to return the encrypted data to its original format. However, once the data is decrypted, such data is subject to potential loss or use in an unapproved or illegal manner that may cause the very damage that the encryption process was intended to prevent.

Other conventional systems use irreversible cryptographic algorithms, or one-way functions, such as MD-5 (also referred to as message digest 5), SHA-1 or SHA-256, to obfuscate sensitive or confidential data. Existing irreversible cryptographic algorithms cause data to be undecipherable and irreversible to protect the confidentiality and security of the data. The irreversible one-way function, when applied to data, results in an identical unique value for the same data regardless of the data source. Therefore, irreversible cryptographic algorithms are often used as a document signature, to make unauthorized document alteration detectable when the document is being shared across parties. For example, suppose a phone number in an original document is altered (for example, by changing the formatting), and irreversibly encrypted. If the original, unaltered data is also irreversibly encrypted, the two encrypted values are different, indicating that one of the electronic documents has been altered.

However, schemes with irreversible cryptographic algorithms comprise an inherent vulnerability to phonebook attacks. Such phonebook attacks are all but theoretical and allow for disclosure of the private data with limited effort. If e.g., a party $P_i$ and a party $P_j$ share their customer databases with Personally Identifiable Data (PII) through a conventional hashing scheme, in which each customer record consists of a unique identifier ID and a corresponding set of hashes of the PII, a phonebook attack might be performed. If e.g., party $P_i$ is not playing fair, it might compute a set of hashes on a phonebook or another large data set and match it with the hashed data set obtained from $P_j$. This attack, which is referred to as a phonebook attack, allows party $P_i$ to reveal nearly all PII contained in party $P_j$'s dataset and defeats the purpose of the hashing.

Accordingly, it would be desirable to be able to provide improved solutions for comparing data sets in a privacy enhanced manner, and to provide improved solutions for comparing data sets in a privacy preserving manner.

SUMMARY OF THE INVENTION

According to an exemplary embodiment of the present invention, a computer implemented method for performing a privacy enhanced comparison of a plurality of data sets includes allocating a private encryption key to each of the data sets; performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and comparing the commutatively encrypted data sets.

In another embodiment, a program product includes computer readable instructions that, when executed by a computer, implement a method of performing a privacy enhanced comparison of a plurality of data sets, the method further including allocating a private encryption key to each of the data sets; performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and comparing the commutatively encrypted data sets.

In still another embodiment, a computer system includes a processor, a memory device in communication with the processor, and a comparison system in communication with the memory device, the comparison system configured to perform a privacy enhanced comparison of a plurality of data sets, the privacy enhanced comparison further including allocating a private encryption key to each of the data sets; performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and wherein the comparison is performed by means of the commutatively encrypted data sets.

DESCRIPTION OF THE DRAWINGS

Exemplary embodiments of the invention are described in detail below, by way of example only, with reference to the following schematic drawings.

FIG. 2a illustrates a method for comparing data sets in a privacy enhanced way with a round robin communication scheme;

FIG. 10 illustrates a flow chart of exemplary embodiments of matching operations;

DETAILED DESCRIPTION

Figure 1:
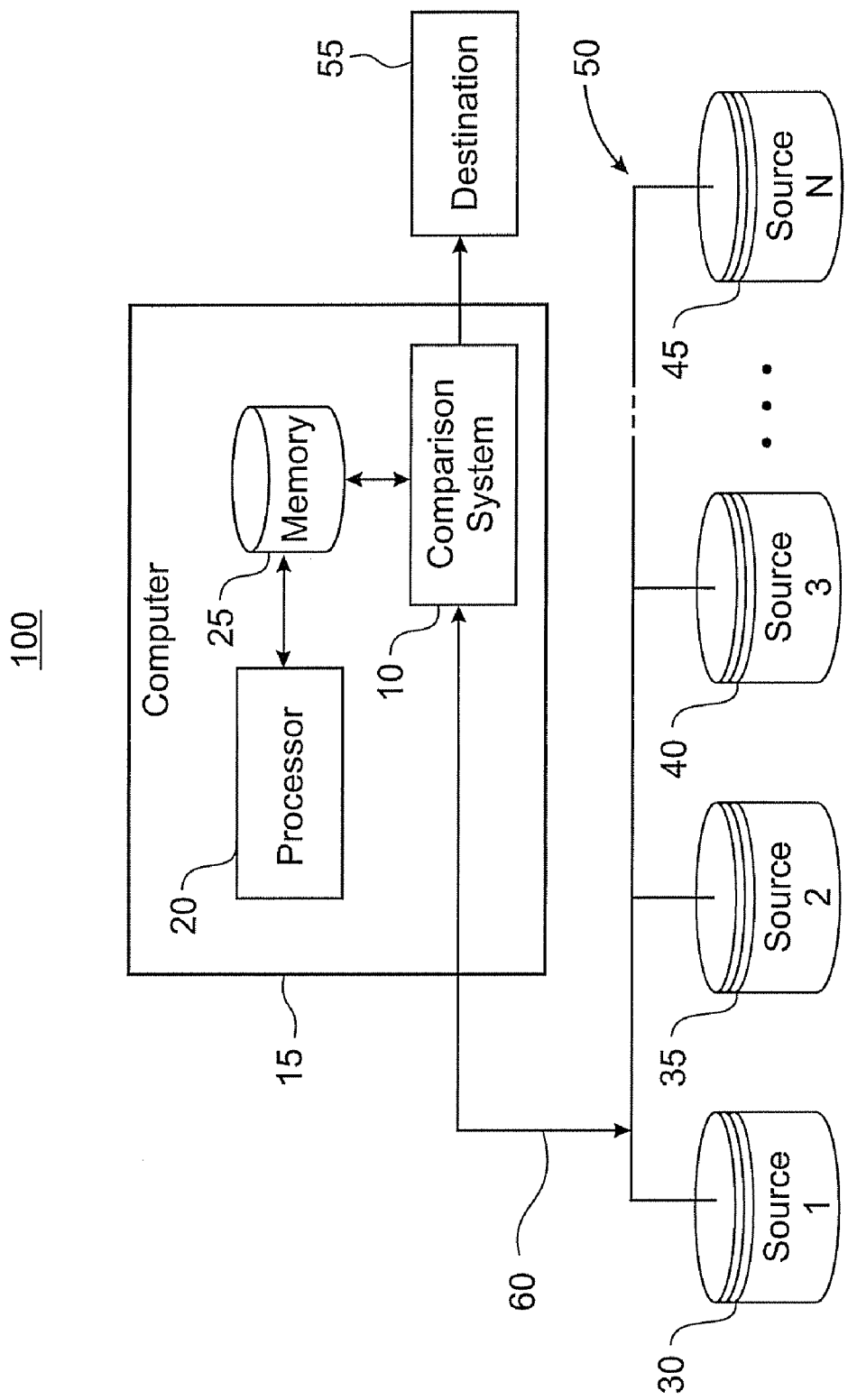
FIG. 1 illustrates a schematic illustration of a general layout of a system for comparing data sets in a privacy enhanced way according to an embodiment of the present invention.

Disclosed herein is a computer implemented method for performing a privacy enhanced comparison of a plurality of data sets, in which a private encryption key is allocated to each of the data sets, and an encryption operation is performed for each of the data sets. The encryption operation includes generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets. The commutatively encrypted data sets are then compared. The data sets may be owned by different parties that do not want to reveal their data sets to the other parties, but still would like to perform some comparison of the data sets in a privacy enhanced way. Parties that own a data set are also denoted as data set owner.

For security and privacy reasons the private encryption keys of the encryption functions of a party should be kept secret by the party.

According to this embodiment of the invention a private encryption key is allocated to each of the data sets. This private encryption key defines a specific keyed commutative encryption function from the family of encryption functions that have been chosen for the comparison.

The encryption operation is performed for each of the data sets to be compared. Upon completion of the encryption operation the data sets have been commutatively encrypted by means of the keyed commutative encryption function defined by the private encryption key of the respective data set and by the keyed commutative encryption functions defined by the private encryption keys of the other data sets involved in the comparison.

If two or more parties want to compare a data set with one or more other parties, each of the parties use a private encryption key for selecting a keyed commutative encryption function from the family of the commutative encryption functions. Then each of the parties applies its keyed commutative encryption function on its own data set and on the data sets of the other parties.

This method reduces the susceptibility for phonebook attacks and provides a fair and privacy enhanced approach for comparing data sets and performing information trading.

The comparing operation comprises in particular evaluating whether one or more data records of the commutatively encrypted data sets match.

According to an embodiment of the invention the commutative encryption function is a one way commutative encryption function, in particular a Hash-function. This includes trap-door one way functions.

A one way function may be defined as a function that is relatively easy to compute, but significantly harder to undo or reverse.

According to an embodiment of the invention, the commutative encryption function is a two-way commutative encryption function. Such a two-way encryption function could be e.g., a private key/public key encryption scheme. In the case of a two way-commutative encryption function, the private encryption key may define both an encryption and decryption key, one efficiently computable from the other.

According to an embodiment of the invention a keyed commutative encryption function may be defined in mathematical terms as follows.

A keyed commutative encryption function $H_s: G \rightarrow G^*$ with encryption key $s \in K$, with K being the key space and G and $G^*$ being groups, is a function for which the following properties hold:

$H_s(m)$ is efficiently computable for any input $m \in G$;

Without knowledge of s, inverting the function is hard, that is, it is computationally infeasible for a polynomially bounded party to compute the function $H_s^{-1}(h)$ for a given $h \in G^*$;

For all $s_1, s_2 \in K$ and all $m \in G$, the following holds: $H_{s_1}(H_{s_2}(m)) = H_{s_2}(H_{s_1}(m))$. This is denoted as commutativity.

According to an embodiment of the invention the data sets comprise data records and the data records comprise an identifier and one or more data items allocated to the identifier, wherein the commutatively encrypted data sets are generated by successively applying the keyed commutative encryption function on the data items of the respective data set.

Such a data record format allows for a separation between data items that may comprise PII-data and identifiers that do not comprise any PII-data. According to this embodiment of the invention the keyed commutative encryption is performed for the data items, thereby protecting the privacy or secrecy of these data items.

According to an embodiment of this aspect of the invention the encryption operation comprises performing the following encryption sub-operations for each of the data sets:

generating a first encrypted data set by means of applying the keyed commutative encryption function on the respective data set with the private encryption key of the respective data set, generating a second encrypted data set by means of applying the keyed commutative encryption function on the first encrypted data set with the private encryption key of one of the other data sets, generating further encrypted data sets by means of successively applying the keyed commutative encryption function on the respective previously encrypted data set with the private encryption keys of one of the remaining data sets until the private encryption keys of all data sets have been utilized.

As an example, if only a first data set and a second data set shall be compared, the method according to this aspect of the invention comprises the following operations:

generating a first encrypted data set by means of applying the keyed commutative encryption function with a first private encryption key on the first data set, generating a second encrypted data set by means of applying the keyed commutative encryption function with a second private encryption key on the first encrypted data set, generating a third encrypted data set by means of applying the keyed commutative encryption function with the second private encryption key on the second data set, generating a fourth encrypted data set by means of applying the keyed commutative encryption function with the first private encryption key on the third encrypted data set.

Then the second and the fourth encrypted data sets are compared.

According to a further embodiment of this aspect of the invention the data sets are allocated to two or more parties and the encryption is performed between the parties in a round-robin scheme, wherein each of the parties performs the following operations:

applying the keyed commutative encryption function with its own private encryption key on its own plaintext data set and on encrypted data sets received from one of the other parties, forwarding the encrypted data sets to one of the other parties.

The order of the round robin scheme may be defined or predefined in an arbitrary way. The aim of the round robin scheme is to apply each of the keyed commutative encryption function of the parties on each data set that is involved in the comparison. Due to the commutative property of the commutative encryption function the order of the encryption is arbitrary.

Preferably the party applies its keyed commutative encryption function at first on its own data set and forwards the encrypted data set then to the other parties for further encryption with their commutative encryption function. Such a round robin scheme has the advantage that apart from the parties that would like to compare their data sets in a privacy enhanced way no further parties or entities have to be involved.

According to a further embodiment of this aspect of the invention the data sets are allocated to two or more parties and the encryption is controlled by a coordinator, the coordinator being provided for receiving commutatively encrypted data sets from the parties, forwarding the commutatively encrypted data sets for further encryption to the other parties until each party has applied the keyed commutative encryption function with its private encryption key on each data set.

According to this embodiment of the invention the coordinator takes care of the distribution of the data sets between the parties. According to this embodiment there is no direct communication necessary between the parties.

According to a further embodiment of the invention the method comprises one or more pre-processing operations for the data records.

Such a pre-processing can e.g., be used to facilitate the efficiency, matching accuracy and speed of the comparing process. In addition, measures to further increase the security may be introduced.

According to a further embodiment of the invention the method comprises a pre-processing operation of transforming data records of one or more formats in a standardized comparison format.

Such a standardized comparison format facilitates an efficient encryption and comparison of the data sets.

According to a further embodiment of the invention the method comprises a pre-processing operation of adding noise to one or more of the plurality of data sets.

This reduces the amount of information other parties than the owner learn about the data sets. Noise may consist of data records comprising random data items and/or of data records with a suitable probability distribution. The noise may be added by the respective party to its own data sets in order to improve the privacy of the data.

According to a further embodiment of the invention the method comprises a pre-processing operation of performing a data item uniqueness transformation to one or more of the data sets.

Such a data item uniqueness transformation transforms a data set to a version of the data set in which every data item occurs exactly once, that is, duplicates are removed. Preferably data type information is removed from the data items. The association between the identifiers of the data records and the data items is broken.

An inverse transformation that allows for reconstructing the data set structure from an encrypted variant of this transformed data set is retained by the respective party.

After all parties have encrypted the transformed data set by applying their commutative encryption function, this inverse transformation allows the data set owner to obtain an encrypted data set that resembles the structure of the data set before the data item uniqueness transformation has been applied. In other words, the data set remains transformed only as long as it is being encrypted by all parties. This data item uniqueness transformation operation can reduce the amount of information being leaked and preclude statistical attacks based on the known or assumed frequency of data items.

According to a further embodiment of the invention the method comprises a pre-processing operation of performing a pre-encryption of one or more data sets by means of generating a pre-encrypted data set of the respective data set, wherein the pre-encrypted data set is generated by applying the keyed commutative encryption function on the respective data set with a second private encryption key of the respective data set.

This optional pre-encryption operation is done with a second private encryption key allocated to the respective data set. The pre-encryption operation prevents parties that are not eligible for matching from being able to match certain data sets that they obtain for encryption during the encryption operations. The decryption of the pre-encrypted data sets can be performed by means of providing an invertible encryption function as commutative encryption function.

According to a further embodiment of the invention the method comprises an identifier encryption operation for encrypting the identifiers of the data records by means of a two way encryption scheme.

Such a two way encryption scheme may be established by means of an encryption/decryption key-pair, e.g., a public/private key pair allocated to the respective data set or the party owning the data set respectively. Furthermore, also one or more of the other parties may be involved in the identifier encryption. The identifier encryption may be performed with the public encryption key of the respective party.

In this embodiment a matching results in a set of data records whose identifiers are encrypted. This embodiment allows for quantitative control by a defined subset of the parties over the resolved identities. Hence the privacy is further improved.

According to a further embodiment of the invention the identifier encryption operation further comprises a random mixing of the data records.

If the data item uniqueness transformation has been applied, the random mixing is preferably omitted.

The random mixing of the encrypted data records conceals the mapping between an encrypted data record and the identifier it belongs to.

According to a further embodiment of the invention an inverse transformation of the data item uniqueness transformation is provided after the respective data set has been commutatively encrypted by all parties.

If a party has executed the data item uniqueness transformation on its own data set, it can reconstruct the full data set structure using inverse transformation, also denoted as inverse mapping. This explodes the encrypted data set to its original structure that it had before applying the data item uniqueness transformation. This makes the encrypted data set one that it would have been without performing the data item uniqueness transformation.

According to a further embodiment of the invention a decryption of the pre-encryption is provided after the respective data set has been commutatively encrypted by all parties.

If a party has executed the pre-encryption operation on its own data set it performs a decryption of the pre-encryption on this data set after the respective data set has been commutatively encrypted by every party. In other words, the decryption undoes the pre-encryption. According to this embodiment the commutative encryption function is an invertible encryption function.

According to a further embodiment of the invention a distribution operation for distributing one or more of the commutatively encrypted data sets to a predefined number of parties eligible for matching is provided.

After the distribution operation, the parties eligible for matching have copies of the commutatively encrypted data sets that they may use for comparison and matching. Who receives what data sets can be agreed upfront. The communication in the distribution operation may be performed by means of the centrally coordinated scheme or by means of the round-robin scheme. In the centrally-coordinated case the commutatively encrypted data set of a party is sent to all eligible parties by the central coordinator according to a pre-specified policy. In the round-robin case of communication a party sends the commutatively encrypted data set to the next party of the round robin scheme and so forth. The distribution order can be different from the order used during the encryption.

According to a further embodiment of the invention a matching operation for comparing one or more of the commutatively encrypted data sets for similar or identical data items is provided.

The matching operation basically builds on the idea that bit representations of encrypted data items from different commutatively encrypted data sets are equal or similar if and only if the corresponding plaintext items are equal or similar. This is guaranteed by the commutativity property of the applied encryption scheme. A match defines a set of matching data records in multiple data sets. Each party who has obtained encrypted data sets in the distribution operation can perform matching on all those obtained data sets.

According to a further embodiment of the invention an identifier decryption operation is provided for decrypting the encrypted identifier of a matching data record.

The identifier decryption operation is provided if the identifier encryption operation has been executed. The matching party may get the identifier of a matching data record to be resolved in decrypted form by the parties who have encrypted it during the identifier encryption operation. The identifier decryption operation is performed by subsequent decryption by each of the parties who have encrypted it in the identifier encryption operation.

This approach allows for quantitative control over the identity resolution in terms of every involved party knowing how many identity resolutions are being done. This prevents excessive resolving.

According to a further embodiment of the invention a resolving operation for resolving the identities of matching commutatively encrypted data items is provided.

According to one embodiment the resolving operation comprises looking up the plaintext entries of the matching commutatively encrypted data items by means of identifiers allocated to the respective data items.

According to this embodiment the data item resolving, also denoted as resolution, may be performed by means of a data set or database lookup using the identifiers of matching data records. The data set lookup can be done on both local and remote data sets containing the plaintext data items. This data item resolving operation allows for quantitative control over the remote resolving, but there is no quantitative control over the local resolving.

Such a resolving by means of the identifiers allow for an efficient implementation of the resolving operation. A match means that two or more data records comprise the same or similar commutatively encrypted data items. The resolving may be performed e.g., by the party that owns the respective data set. The owner of the respective data set may resolve encrypted data items that correspond to a matching identifier by means of looking up the plaintext data items from a copy of the original data set.

According to a further embodiment of the invention the resolving operation comprises
- a randomizing operation for randomizing an encrypted data item to be resolved by a party eligible for resolving,
- a commutative decryption operation performed by all parties having been involved in the commutative encryption for commutatively decrypting the randomized encrypted data item by means of their private decryption keys,
- a de-randomizing operation by the party eligible for resolving.

For this embodiment of the invention it is assumed that the identifier encryption operation has been executed and the commutative encryption function is a commutative two way encryption function. This allows that data items can be resolved without the data set owner learning the data items or the data records they belong to. This results in an improved private resolving scheme and a quantitative control over the resolving process by a subset of the parties.

In the randomizing operation the encrypted data items to be resolved are randomized by the matching party. Then the commutative decryption operation is performed by all parties. The data set owner of the matching data record is preferably the last party to perform the commutative decryption. The data set owner does not learn the data item being resolved, but only a randomized data item that may convey no information on the data item. Then the randomized and decrypted data item is provided back to the matching party. The matching party performs the de-randomization operation and de-randomizes the randomized data item to obtain the plaintext data item.

A second aspect of the present invention relates to a computer implemented method for privacy enhanced comparison of a plurality of data sets, wherein the data sets have been commutatively encrypted by the operations of:

allocating a private encryption key to each of the data sets, an encryption operation being performed for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets. Then the comparison is performed by means of the commutatively encrypted data sets.

Another aspect of the invention relates to a computer program comprising instructions for carrying out the operations of the method according to the first and/or the second aspect of the invention when said computer program is executed on a computer system.

Another aspect of the invention relates to a computer system comprising means for carrying out the operations of the method according to the first and/or the second aspect of the invention.

It should be noted that the operations of the different aspects of the invention can be performed in different orders. Furthermore, the operations may also be combined such that, for example, two or more operations are performed together.

Any of the device features may be applied to the method aspect of the invention and vice versa. Advantages of the device features apply to corresponding method features and vice versa.

With reference to FIG. 1, the general layout of a comparison system 10 for comparing data sets in a privacy enhanced way according to an exemplary embodiment of the invention is described. In the figures, same reference signs are used to denote the same or like parts.

FIG. 1 illustrates an exemplary overall environment (a computer processing system 100) in which the comparison system 10, a service, a computer program and an associated method for performing a privacy enhanced comparison of a plurality of data sets according to the present invention may be used. The comparison system 10 comprises a software programming code or a computer program product that may be embedded, for example, within, or installed on a computer 15. All or part of the comparison system 10 may be embodied within various applications and equipment, depending upon confidentiality and security requirements. For example, the comparison system 10 may be embodied on a computer readable medium, may be in a software application on the computer processing system 100, in a memory unit that self-destructs upon any tampering, or in a removable memory such as a CD, DVD or floppy disc.

The present invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems (e.g., data sources contributing obfuscated data) or remote printers or storage devices through intervening private or public networks. Modems, cable modem and Ethernet cards are just a few of the currently available types of network adapters.

The computer processing system 100 comprises at least one computer 15 having a processor 20 and computer readable memory 25. The comparison system 10 is stored in the memory 25 and is executed by the processor 20. The comparison system 10 is coupled via a communication network 60 to data sources 30, 35, 40 and 45. The comparison system 10 is provided for receiving encrypted data records with context from one or more data sources such as data source 1, 30, data source 2, 35, data source 3, 40, through data source N, 45, collectively referenced as data sources 50. The data sources 50 store data sets comprising a plurality of data records.

The comparison system 10 can store received data sets in the memory 25 and can compare any received data sets with other received data sets to perform a comparison of data sets.

The comparison system 10 can send the comparison result to a destination 55.

The comparison system 10 evaluates similarity and/or identity between received data sets in a privacy-preserving manner, enabling a comparison of data sets.

FIG. 2a illustrates a method for comparing data sets $DB_i$ in a privacy enhanced manner according to an embodiment of the invention.

In FIG. 2a the method is only illustrated for one data set $DB_1$. The data set $DB_1$ is allocated to a first party $P_1$ or owned by a first party $P_1$. Further data sets $DB_2$ through $DB_n$ are allocated to further parties $P_2$ through $P_n$ or are owned by the further parties $P_2$ through $P_n$, but are not shown in FIG. 2. The parties $P_1$ through $P_n$ would like to share and compare their data sets $DB_1$ through $DB_n$ in a privacy enhanced way. The parties $P_1$ through $P_n$ are generally denoted as parties $P_i$.

Each of the parties $P_1$ through $P_n$ possess a first private encryption key $s_1$ through $s_n$ that may be allocated to them in an allocation operation. The first private encryption keys $s_1$ through $s_n$ are generally denoted as first private encryption keys $s_i$. The first private encryption keys $s_i$ are kept secret by the parties $P_i$ and provided for defining a private keyed commutative encryption function out of a group of commutative encryption functions for the respective party $P_i$.

Each of the parties $P_1$ through $P_n$ may have a computer system 100 and a comparison system 10.

According to this embodiment of the invention a keyed commutative encryption function $H_s: G \rightarrow G^*$ with encryption key $s \in K$, with K being the key space and G and $G^*$ being groups, is a function for which the following properties hold:

Efficient computability: $H_s(m)$ is efficiently computable for any input $m \in G$;

One-way property: without knowledge of s, inverting the function is hard, that is, it is computationally infeasible for a polynomially bounded party to compute the function $H_s^{-1}(h)$ for a given $h \in G^*$;

Commutativity: for all $s_1, s_2 \in K$ and all $m \in G$, the following holds: $H_{s_1}(H_{s_2}(m)) = H_{s_2}(H_{s_1}(m))$.

A party who knows the private encryption key for an encryption function may be able to invert the function. This is for example the case for a two way commutative encryption function.

The keyed commutative encryption function may be a one way encryption function such as a keyed commutative hash function. Another example is a two way encryption function. In the case of a two way commutative encryption function, the private key defines both an encryption and decryption key, one efficiently computable from the other.

In this exemplary embodiment of the invention a keyed Hash function is chosen as keyed commutative encryption function. The keyed Hash function defined by a first private encryption key $s_i$ of one of the parties $P_i$ is denoted as $Hs_i$.

The notation $H_{s_1,s_2,\ldots,s_n}(m)$ is interchangeably used for $H_{s_1}(H_{s_2}(\ldots H_{s_n}(m)\ldots))$. Furthermore, $H_{s_1,s_2,\ldots,s_n}(m)$ is denoted by HASH (m), whereby m may be e.g., a data set DB, a data record DR or a data item DI.

Figure 2B:
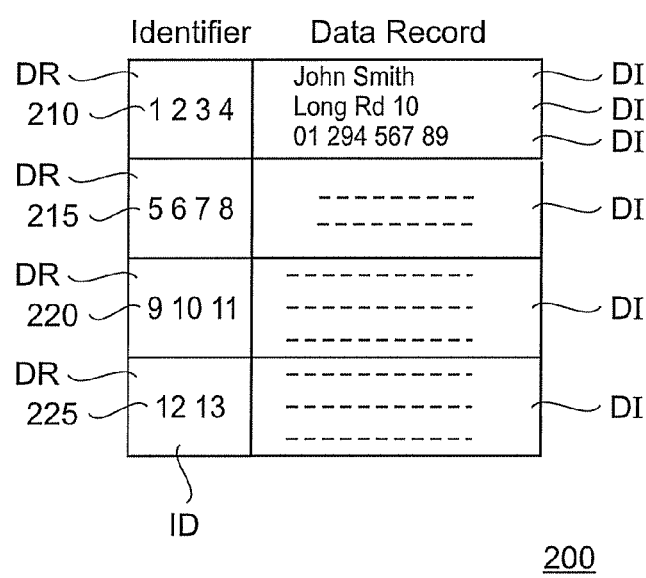
FIG. 2b illustrates an example of a data set provided for comparison comprising data records.

An example of a data set $DB_i$ is shown in FIG. 2b and denoted as data set 200. It comprises data records DR. The data records DR comprise identifiers ID and data items DI. The identifiers ID are provided for identifying the data items DI. Preferably the identifiers ID are numbers. The data items DI are pieces of information such as names, address elements (streets, towns, postal codes), numbers etc.

Referring back to FIG. 2a, the data set $DB_1$, also denoted as data set 200, of the party $P_1$ may be streamed. Then an encryption operation is performed for the data set $DB_1$. The data set $DB_1$ may have been derived from another data set by means of pre-processing. This will be explained in more detail later.

According to this embodiment of the invention party $P_1$ starts the encryption operation and encrypts the data set 200 by applying its keyed commutative encryption function $H_{s_1}$ defined by its private encryption key $s_1$ on the data set $DB_1$. According to this embodiment of the invention only the data items DI of the data set $DB_1$ are encrypted. In other words, the commutative encryption function $H_{s_1}$ is applied separately on all the data items DI of the data set 200. The identifiers ID are not encrypted and kept in their original form. The result of the first encryption is denoted as $H_{s_1}(DB_1)$.

Then the encrypted data set $H_{s_1}(DB_1)$ is forwarded to the second party $P_2$ for further encryption. The second party $P_2$ further encrypts the encrypted data set $H_{s_1}(DB_1)$ by applying its keyed commutative encryption function $H_{s_2}$ defined by its private encryption key $s_2$ on the encrypted data set $H_{s_1}(DB_1)$. The result is denoted as $H_{s_2}(H_{s_1}(DB_1))$.

The party $P_2$ forwards then the encrypted data set $H_{s_2}(H_{s_1}(DB_1))$ to the next party $P_3$ for further encryption. This is repeated until the last party $P_n$ has been involved in the comparison. The last party $P_n$ further encrypts the encrypted data set $H_{sn-1}(\ldots H_{s_2}(H_{s_1}(DB_1))\ldots)$ by applying its keyed commutative encryption function $H_{sn}$ defined by its private encryption key $s_n$ on the encrypted data set $H_{sn-1}(\ldots H_{s_2}(H_{s_1}(DB_1)))$. The result is denoted as $H_{sn}(\ldots H_{s_2}(H_{s_1}(DB_1)))$.

The communication between the parties $P_1 \ldots P_n$ in the embodiment of FIG. 2a is performed in a round-robin scheme.

The encryption operation described above for the database $DB_1$ is performed as well for the other databases $DB_2$, $DB_3$, ... and $DB_n$ that are owned by the other parties $P_2 \ldots P_n$ in a corresponding manner.

As an example, $P_2$ starts the encryption operation for its database $DB_2$ and encrypts the data set $DB_2$ by applying its keyed commutative encryption function $H_{s_2}$ defined by its private encryption key $s_2$ on the data set $DB_2$. The result of this first encryption is denoted as $H_{s_2}(DB_2)$.

Then the encrypted data set $H_{s_2}(DB_2)$ is forwarded to the third party $P_3$ for further encryption. The third party $P_3$ further encrypts the encrypted data set $H_{s_2}(DB_2)$ by applying its keyed commutative encryption function $H_{s_3}$ defined by its private encryption key $s_3$ on the encrypted data set $H_{s_2}(DB_2)$. The result is denoted as $H_{s_3}(H_{s_2}(DB_2))$.

The party P3 forwards then the encrypted data set $H_{s_3}(H_{s_2}(DB_2))$ to the next party $P_4$ for further encryption. This is repeated until the first party $P_1$. The first party $P_1$ further encrypts the encrypted data set $H_{sn}(\ldots H_{s_3}(H_{s_2}(DB_2)))$ by applying its keyed commutative encryption function $H_{s_1}$ defined by its private encryption key $s_1$ on the encrypted data set $H_{sn}(\ldots H_{s_3}(H_{s_2}(DB_2)))$. The result is denoted as $H_{s_1}(H_{sn}(\ldots H_{s_3}(H_{s_2}(DB_2)))$.

The order according to which the parties $P_i$ apply its keyed commutative encryption function on the data records $DB_i$ may be chosen in an arbitrary way. Preferably the party that owns the respective data set applies its keyed commutative encryption function at first.

At the end of the encryption operation all data sets $DB_i$ of the parties $P_i$ have been commutatively encrypted by all parties $P_i$.

After the encryption operation a distribution operation is performed. In the distribution operation the data records $HASH(DB_i)$ that have been commutatively encrypted by every party $P_i$ are distributed to all parties $P_i$ that are eligible to perform a matching. In the example shown in FIG. 2a all parties $P_i$ are eligible for a matching and accordingly the commutatively encrypted data record HASH (DB1), denoted with the reference numeral 210, is distributed to all parties $P_1 \ldots P_n$.

A corresponding encryption operation and distribution operation is performed for the other data records $DB_2 \ldots DB_n$ of the other parties $P_2 \ldots P_n$ as well.

Figure 3:
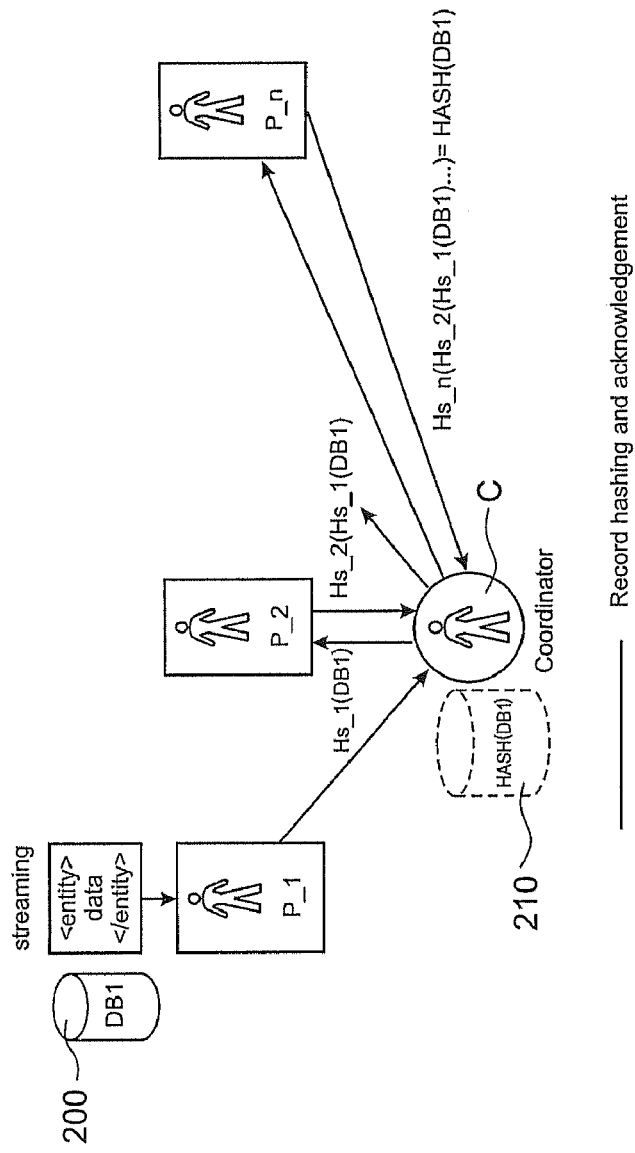
FIG. 3 illustrates a method for comparing data sets in a privacy enhanced way with a centrally coordinated communication scheme.

FIG. 3 illustrates a method for comparing data sets in a privacy enhanced manner according to another embodiment of the invention.

In FIG. 3 the method is only illustrated for one data set $DB_1$. The data set $DB_1$ is allocated to a first party $P_1$ or owned by a first party $P_1$. Further data sets $DB_2$ through $DB_n$ are allocated to further parties $P_2$ through $P_n$ or are owned by the further parties $P_2$ through $P_n$, but are not shown in FIG. 3. The parties $P_1$ through $P_n$ or a subset of them would like to share and compare their data sets in a privacy enhanced way.

According to this embodiment of the invention the communication between the parties $P_1$ through $P_n$ is controlled by a central coordinator C.

The data set $DB_1$, also denoted as data set 200, of the party $P_1$ may be streamed. Then an encryption operation is performed for the data set $DB_1$. The data set $DB_1$ may have been derived from another data set by means of pre-processing. This will be explained in more detail later.

According to this embodiment of the invention party $P_1$ starts the encryption operation and encrypts the data set 200 by applying its keyed commutative encryption function $H_{s1}$ defined by its private encryption key $s_1$ on the data set $DB_1$. The result of the first encryption is denoted as $H_{s1}(DB_1)$.

Then the encrypted data set $H_{s1}(DB_1)$ is sent to the central coordinator C who forwards it to the second party $P_2$ for further encryption. The second party $P_2$ further encrypts the encrypted data set $H_{s1}(DB_1)$ by applying its keyed commutative encryption function $H_{s2}$ defined by its private encryption key $s_2$ on the encrypted data set $H_{s1}(DB_1)$. The result is denoted as $H_{s2}(H_{s1}(DB_1))$.

The party $P_2$ sends the encrypted data set $H_{s2}(H_{s1}(DB_1))$ again to the central coordinator C who forwards it to the next party $P_3$ for further encryption. This is repeated until the last party $P_n$ has become involved in the commutative encryption. The last party $P_n$ further encrypts the encrypted data set $H_{sn-1}(\ldots Hs_2(H_{s1}(DB_1))$ by applying its keyed commutative encryption function $H_{sn}$ defined by its private encryption key $s_n$ on the encrypted data set $H_{sn-1}(\ldots H_{s2}(H_{s1}(DB_1))$. The result is denoted as $H_{sn}(\ldots H_{s2}(H_{s1}(DB_1))$ and again sent to the central coordinator C.

The encryption operation described above for the database $DB_1$ is performed as well for the other databases $DB_2$, $DB_3$, ... and $DB_n$ that are owned by the other parties $P_2 \ldots P_n$ in a corresponding manner.

The order according to which the parties $P_i$ apply its keyed commutative encryption function on the data records $DB_i$ may be chosen in an arbitrary way. Preferably the party that owns the respective database applies its keyed commutative encryption function at first.

After the encryption operation a distribution operation may be performed. In the distribution operation the data records HASH(DBi) that have been commutatively encrypted by every party Pi are distributed to all parties Pi that are eligible to perform a matching by the central coordinator C. In the example shown in FIG. 3 only the coordinator is eligible for matching and accordingly the commutatively encrypted data record HASH (DB1) is only available at the central coordinator C.

Figure 4:
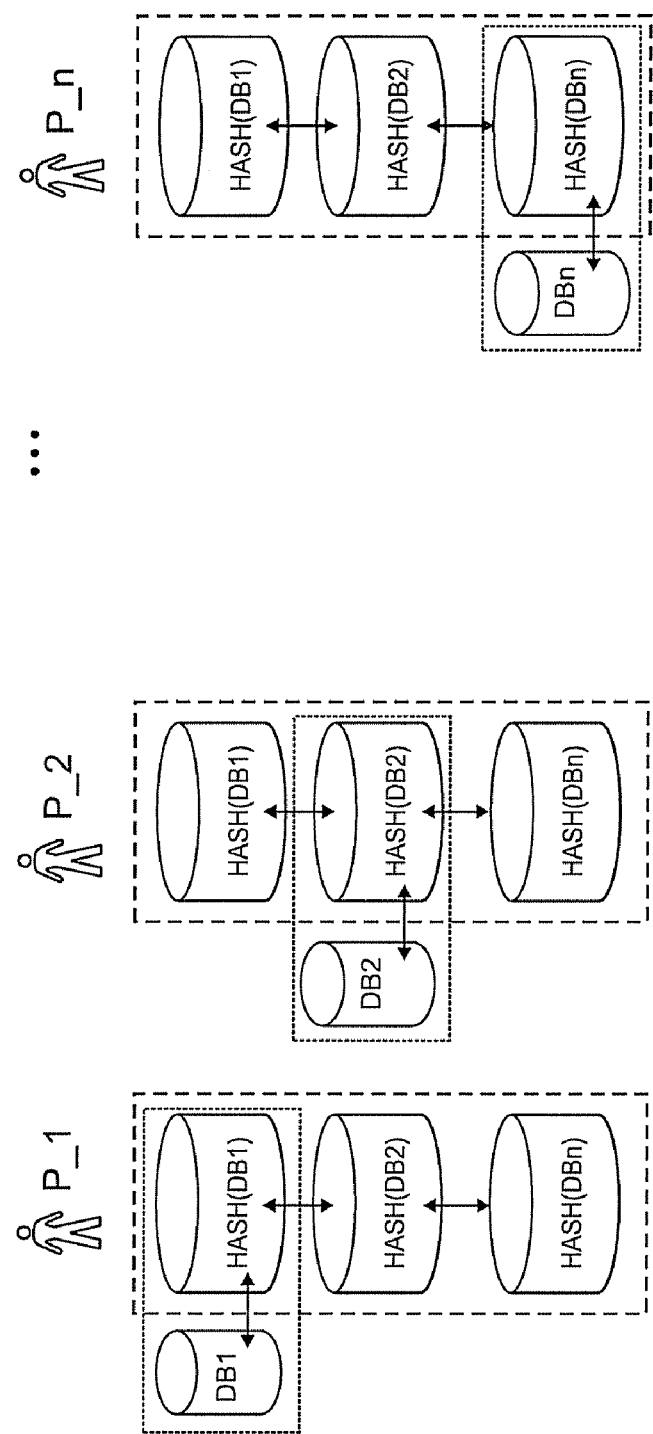
FIG. 4 illustrates a matching operation performed by the parties.

FIG. 4 illustrates a matching operation for matching commutatively encrypted data records DR for the round robin scheme as described above with reference to FIG. 2a.

In this example it is assumed that each of the parties $P_1$ through $P_n$ are eligible for matching, but according to other embodiments of the invention only a reduced subset of the parties $P_1$ through $P_n$ may be elected to perform a matching. Accordingly, in the previous distribution operation all parties $P_1$ through $P_n$ have been provided with a copy of the commutatively encrypted data sets HASH ($DB_1$), HASH ($DB_2$) ... HASH ($DB_n$).

Each of the parties $P_1$ through $P_n$ may then perform a matching of the commutatively encrypted data sets HASH ($DB_1$), HASH ($DB_2$) ... HASH ($DB_n$). More specifically, the matching operation operates on the encrypted data items DI of the data sets $P_1$ through $P_n$.

The matching operation basically builds on the idea that bit representations of obfuscated data items DI from different commutatively encrypted data sets HASH($DB_i$) and HASH($DB_j$) are equal if and only if the corresponding plaintext data items are equal. This is provided by the commutativity property of the applied encryption scheme. This allows for finding matching encrypted data records. A match defines a set of matching data records in multiple data sets.

According to the exemplary embodiment of the invention as illustrated in FIG. 4 each of the parties $P_1$ through $P_n$ perform a comparison of the commutatively encrypted data sets $DB_1$ through $DB_n$. In other words, the parties $P_1$ through $P_n$ search the data sets $DB_1$ through $DB_n$ for matching encrypted data items. In other words, the parties $P_1$ through $P_n$ evaluate whether there are one or more identical or similar data items in two or more different data sets $DB_i$. The degree of similarity that qualifies for a match may be defined by a predefined threshold or one or more other predefined criteria.

After the matching operation a resolution or resolving operation may be performed by the parties $P_i$ for the found matches. The resolving operation allows a party $P_i$—once matching data records have been found in the matching operation—to obtain the plaintext data items of the matching data records. This may involve getting plaintext data items from their own local data sets and from remote data sets of other parties $P_i$. Subsets of data records may be resolved as well as full data records.

In the example shown in FIG. 4 the resolving is performed locally by the parties $P_1$ through $P_n$ by means of a local plaintext copy of the respective data set $DB_i$. As an example, the first party $P_1$ checks at first if there are any matching data items DI in the encrypted data sets $DB_1$ through $DB_n$. If matching encrypted data items have been found, party $P_1$ may look up the corresponding plaintext data items in the local copy of the database $DB_1$ by means of the identifier allocated to the matching encrypted data item. This local resolving may be performed for all matches comprising a data item DI of the data set $DB_1$ and one or more data items DI of the data sets $DB_2$ through $DB_n$. If party $P_1$ finds a match between two of the data sets $DB_2$ trough $DB_n$, a local resolving or resolution by party $P_1$ with its local copy of the data set $DB_1$ is not possible. As an example, if party $P_1$ finds a match between the data set $DB_2$ and the data set $DB_n$, only party $P_2$ and party $P_n$ are able to resolve the match by means of their local plaintext copies of their local databases $DB_2$ and $DB_n$ respectively. In this case party $P_1$ would have to ask party $P_2$ or Party $P_n$ for a resolving. This is also denoted as remote resolving.

The resolving operation may be executed for each data record that a party would like to resolve, that is, a subset of the matching data records.

The resolving according to this embodiment of the invention using the identifiers ID of matching data records may be denoted as database or data record lookup. This embodiment applies a basic commutative encryption scheme with encrypted data items DI, but without encrypted identifiers ID. Such a basic resolving scheme may perform local identity resolution in conjunction with resolution by request from the database or data set owner of the respective matching data records. If a matching data record is from a data set $DB_i$ of a party $P_i$, the corresponding plaintext data set $DB_i$ is used for the resolving.

In general, each party $P_i$ who has obtained commutatively encrypted data sets can perform matching on all those obtained data sets. This allows for the enforcement of a matching policy that defines the data sets a party may use for matching.

Figure 5:
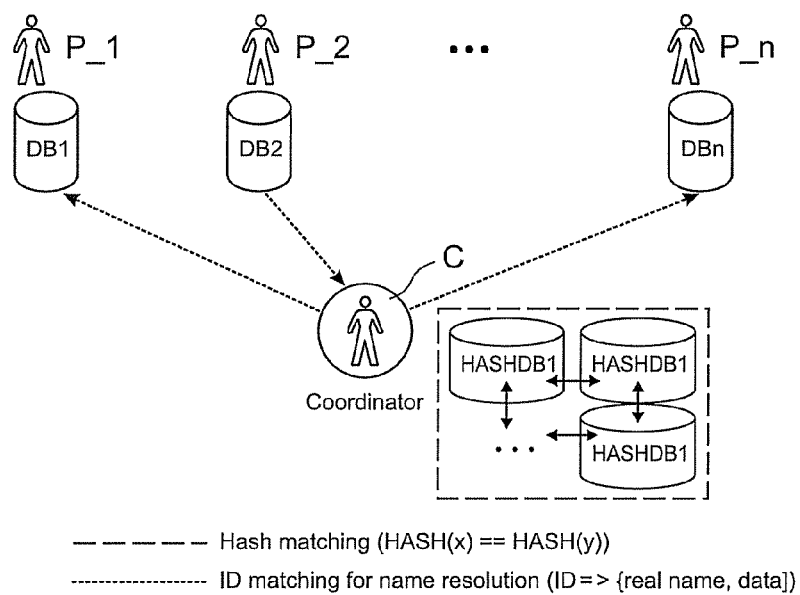
FIG. 5 illustrates a matching operation performed by a central coordinator.

FIG. 5 illustrates a matching operation and a corresponding resolving operation for matching and resolving commutatively encrypted data records for the centrally coordinated scheme of FIG. 3.

In this example it is assumed that only the coordinator C is eligible to perform the matching. Accordingly, in the previous distribution operation the coordinator has been provided with a copy of the commutatively encrypted data sets HASH ($DB_1$), HASH ($DB_2$) ... HASH ($DB_n$).

According to the exemplary embodiment of the invention as illustrated in FIG. 5 the coordinator C performs a comparison of the encrypted data sets HASH (DB$_1$), HASH (DB$_2$) ... HASH (DB$_n$). In other words, the coordinator C searches the data sets HASH (DB$_1$), HASH (DB$_2$) ... HASH (DB$_n$) for matching encrypted data items DI. In other words, the coordinator C examines whether there are one or more identical or similar data items that fulfill a predefined similarity criteria in two or more of the commutatively encrypted data sets HASH (DB$_1$), HASH (DB$_2$) ... HASH (DB$_n$).

According to this exemplary embodiment of the invention the resolving operation is centrally controlled by the coordinator C as well. The coordinator C is provided for sending or distributing the results of the matching operation, i.e., the matching encrypted data records, to the parties P$_i$ that are eligible for resolving. According to an exemplary embodiment of the invention each of the parties P$_i$ is provided with the matching data records of its own data set DB$_i$. As an example, it may be assumed that the matching operation has resulted in a match between the data record X of the data set DB$_1$, comprising the identifier IX and the encrypted Data Item DIX, and the data record Y of the data set DB$_2$, comprising the identifier IY and the encrypted data item DIY. This means that the encrypted data items DIX and DIY are identical or similar. In this example the central coordinator C would provide the data record X or only the identifier IX to the Party P$_1$ and the data record Y to the party P$_2$. The party P$_1$ possesses a locally stored copy of the data set DB$_1$ and can resolve the encrypted data record X by means of a database lookup in the data set DB$_1$. The database lookup may be performed by taking the identifier IX of the encrypted data record X, searching for this identifier IX in the corresponding identifier column of the data set DB$_1$ and looking up the plaintext entry of the data item that corresponds to the identifier IX. The party P$_2$ possesses a locally stored copy of the data set DB$_2$ and can resolve the encrypted data record Y by means of a database lookup in the data set DB$_2$. The database lookup may be performed by taking the identifier IY of the encrypted data record Y, searching for this identifier IY in the corresponding identifier column of the data set DB$_2$ and looking up the plaintext entry of the data item that corresponds to the identifier IY.

According to another embodiment of the invention the central coordinator C may provide all or a part of the matching data records to all the parties P$_1$ through P$_n$. Then the parties P$_1$ through P$_n$ may perform local resolving for all matches comprising a data item DI of their own data sets. If a party P$_i$ finds a match between two data sets of two other parties P$_j$ and P$_l$, a local resolving or resolution by party P$_i$ is not possible. In this case party P$_i$ would have to ask party P$_j$ or party P$_l$ or both for a resolving by means of a resolving request. Such a resolving request would be performed via the coordinator C.

In general, the communication in the resolving operation can be performed by means of a centrally coordinated scheme or a round-robin scheme with all or only the required parties in the sequence of parties. The resolving of each data record may involve a different data set owner to perform the resolution with.

Figure 6:
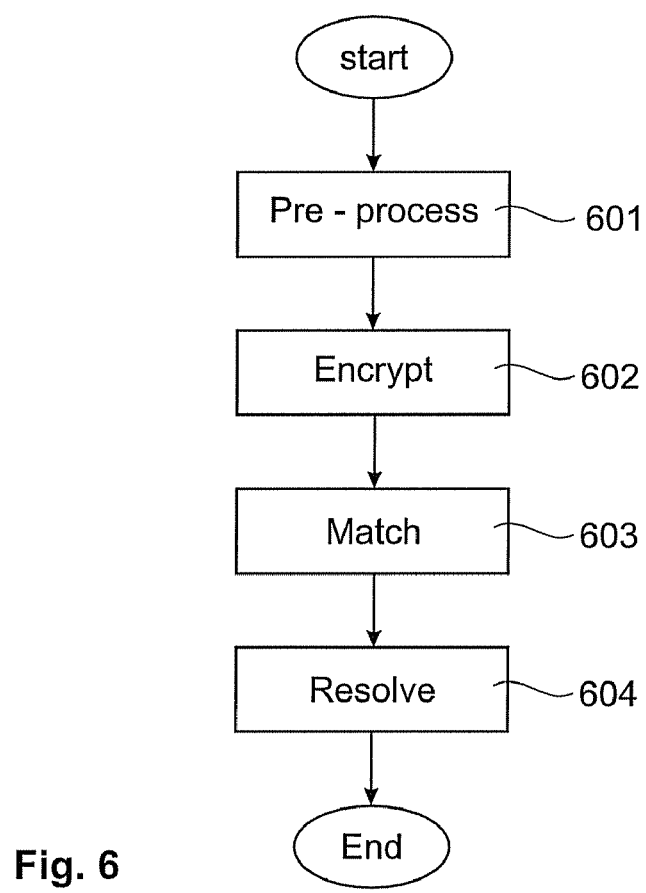
FIG. 6 illustrates a flow chart with the basic operations of a method for comparing data sets in a privacy enhanced way.

FIG. 6 illustrates a flow chart of a basic scheme of a computer-implemented method for privacy enhanced comparison of data sets.

The method comprises one or more pre-processing operations 601 for pre-processing the data records of the data sets that shall be compared in a privacy enhanced way.

The method comprises one or more encryption operations 602 for encrypting the pre-processed data records.

The method comprises one or more matching operations 603 for matching the encrypted data records.

The method comprises one or more resolving operations 604 for resolving matching encrypted data records.

FIG. 7 to 10 illustrates exemplary embodiments of the operations of the basic scheme of the computer-implemented method for privacy enhanced comparison of data sets in more detail.

For the following description it is assumed that a party P$_i$ has a first private encryption key s$_i$ a second private encryption key s'$_i$ and a public/private encryption key pair (pk$_i$, sk$_i$). In case of required invertability of the commutative encryption function, keys ŝ$_i$ and ŝ'$_i$ are stored by the parties P$_i$ as well. Every party P$_i$ has a data set DB*$_i$ of the form R*$_{i,x}$= $\langle$ID*$_{i,x}$,$\langle$\{m*$_{i,x,1}$, ..., m*$_{i,x,l}$, ... m*$_{i,x,k*_{i,x}}$\}$\rangle\rangle$ where ID*$_{i,x}$ is the unique identifier of data record R*$_{i,x}$. The values m*$_{i,x,l}$ for $1 \leq l \leq k*_{i,x}$ are the data items DI (attributes) corresponding to the identifiers ID*$_{i,x}$. These data items DI are used to create the data sets to be encrypted. Each data item DI may be either tagged with type information or this type information can be inferred from the tuple index of the element or other means (e.g., other ways of database structure). In the further description it is assumed that this type information is available unless it is mentioned that it is being removed.

Figure 7:
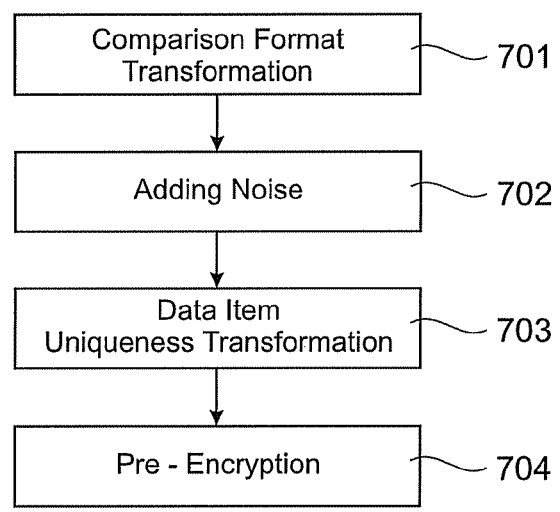
FIG. 7 illustrates a flow chart of exemplary embodiments of pre-processing operations.

FIG. 7 illustrates exemplary embodiments of the pre-processing operations 601 in more detail.

A pre-processing operation 701 performs a transformation of data records selected for privacy enhanced comparison to a standardized comparison format. Such a standardized comparison format facilitates an efficient and effective implementation of the further operations.

By means of the pre-processing operation 701 multiple combinations and variants of attributes of data records of the data set DB*$_i$ are composed in a well-defined standardized way to produce a data set DB$_i$ with data records in a standardized format. This facilitates advanced matching algorithms on the data records without knowing the data items in plaintext, but only in an encrypted form. Abstractly, this operation creates the data items $m_{i,x,1}, \ldots, m_{i,x,l}, \ldots, m_{i,x,k_{i,x}}$ from the data items of the data sets of the parties.

In a further pre-processing operation 702 noise is added to one or more of the plurality of data sets. Adding noise reduces the amount of information other parties than the owner learn about a database or data set. Noise may be added by data records comprising random data items and/or by additional data records from a suitable probability distribution.

In a further pre-processing operation 703 a data item uniqueness transformation is performed on one or more of the data sets.

This pre-processing operation 703 transforms the complete data set DB$_i$ to a version of the data set in which every data item occurs exactly once. In other words, duplicate data items are removed. Preferably, data type information is removed from the data items. The association between the identifiers ID of the data records DR and data items DI is broken. An inverse mapping that allows for reconstructing the data set structure from an encrypted variant of this transformed data set is retained by the parties. After the encryption operation 602 this inverse mapping allows the data set owner to obtain an encrypted data set that resembles the structure of the data set before the data item uniqueness transformation has been applied. The data set remains transformed only as long as it is being encrypted by all parties. This pre-processing operation 703 can reduce the amount of information being leaked and precludes statistical attacks based on the known or assumed frequency of data items.

Figure 8:
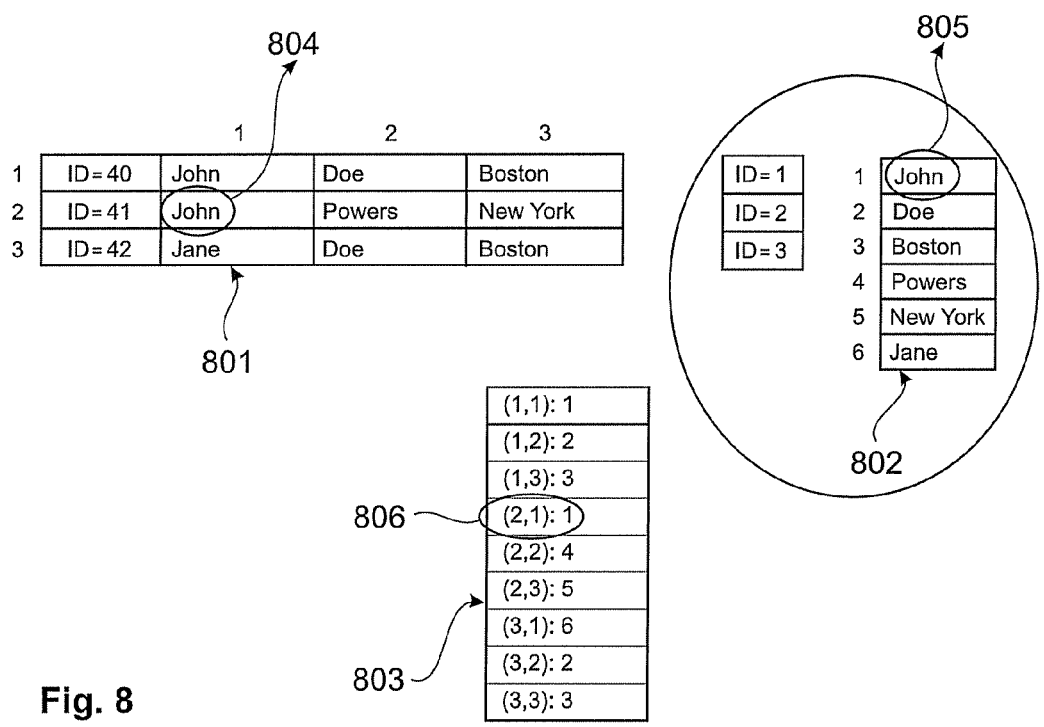
FIG. 8 illustrates an example for a data item uniqueness transformation and a corresponding inverse transformation.

FIG. 8 illustrates an example for a data item uniqueness transformation and the corresponding inverse transformation or mapping that is retained to invert the transformation.

Table 801 illustrates an exemplary embodiment of a data set after operations 701 and 702 have been applied. Table 802 illustrates the resulting transformed data set and table 803 as mapping table the resulting mapping. For example, the data item (entry) 804 "John" in the second row and first column is transformed to the first entry 805 "John" in the transformed data set 802. The corresponding mapping entry (mapping rule) in the mapping table 803 is (2,1):1, provided with reference numeral 806. The mapping table 803 allows for an inverse mapping from the table 802 to the table 801.

Referring back to FIG. 7, in a further pre-processing operation 704 a pre-encryption of one or more data sets is performed by means of generating a pre-encrypted data set of the respective data set.

The pre-encrypted data set is generated by applying the keyed commutative encryption function on the respective data set with the second private encryption key $s'_i$ of the respective party. The pre-processing operation 904 prevents parties that are not eligible for matching from being able to match certain data sets that they obtain for commutative encryption in the encryption operation 602. The decryption, i.e., the inversion of the pre-encryption, may be enabled by providing or choosing an invertible encryption function for the commutative encryption.

Figure 9:
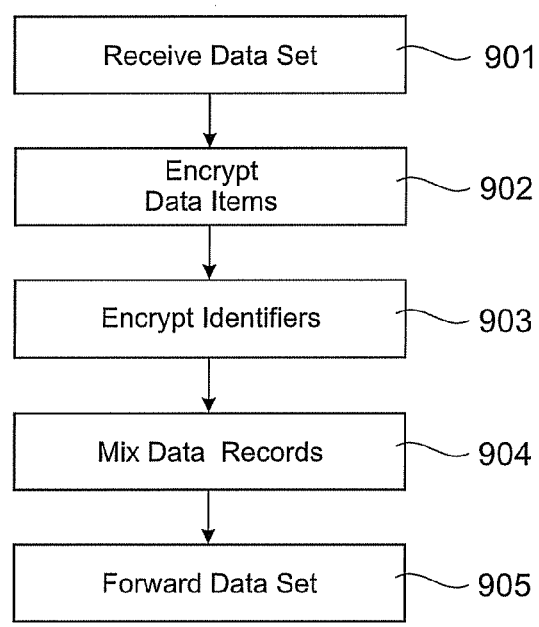
FIG. 9 illustrates a flow chart of exemplary embodiments of encryption operations.

FIG. 9 illustrates exemplary embodiments of the encryption operations 602 in more detail.

The encryption operations 602 are described for a data set $DB_i$ of a party $P_i$.

A sequence $b=(b_1, \ldots, b_n)$ defines an (arbitrary) total order over the parties with the preference that $P_{b_1}$ is $P_i$.

In a receiving operation 901 the data set $DB_i$ of party $P_i$ is received by a party $P_j$.

Then an encryption operation 902 performs the basic encryption of the data set $DB_i$, i.e., the encryption of the data items $DI_i$ being carried out by the parties $P_i$. The encryption operation 902 is also denoted as data item encryption operation 1002.

In the data item encryption operation 902 every party $P_j$ applies the commutative encryption function using their private encryption key $s_j$ to every data item in the received data sets. Preferably, the data set owner $P_i$ applies the commutative encryption function first and the order of the remaining parties may be defined by the central coordinator C or in the round-robin scheme through the sequence $b=(b_1, \ldots, b_n)$.

In other words, in the data item encryption operation 902 each party $P_{b_l}$ receives a data set $DB_{i,b_{l-1}}$ from the central coordinator C or the previous party $P_{b_{l-1}}$. This data set $DB_{i,b_{l-1}}$ has already been encrypted by the previous parties in the sequence. Party $P_{b_l}$ executes a local encryption operation on the data items of this data set using its key $s_{b_l}$. The resulting further encrypted data set $DB_{i,b_l}$ is sent back to the central coordinator C or to the next party $P_{b_{l+1}}$ in the sequence depending on the distribution scheme being used.

In an optional identifier encryption operation 903 the identifiers ID of the data records DR are encrypted by a subset of the parties with their public encryption keys $pk_{(i)}$ of their public/private encryption key pair ($pk_i$, $sk_i$).

According to a preferred embodiment of the invention the records are randomly mixed in a data record mixing operation 904.

The data record mixing operation 904 is preferably omitted if the data item uniqueness transformation 703 has been executed.

Then the data set is forwarded in a forwarding operation 905 to the next party for further encryption, either directly or via the central coordinator C.

FIG. 10 illustrates exemplary embodiments of the matching operations 603 in more detail.

The matching operations 603 are started after the encryption operations 602 have been executed by every party.

If a party $P_i$ has executed the pre-encryption operation 704 on its own data set $DB_i$ it performs in operation 1001 a decryption of the pre-encryption on this data set after it has been commutatively encrypted by every party. This de-pre-encryption is performed with key $\hat{s}'_i$ on the respective data set. In other words, the decryption undoes the pre-encryption operation 704. This provides for the final data set used for the matching being HASH ($DB_i$). This option implies that the commutative encryption function is an invertible encryption function.

If a party has executed the data item uniqueness transformation on its own data set, it reconstructs in operation 1002 the full data set structure using the inverse mapping obtained in the processing data item uniqueness transformation operation 703 on the encrypted data set. This operation 1002 explodes the encrypted data set to its original structure that it had before applying the data item uniqueness transformation in operation 703. This makes the encrypted data set one that it would have been without performing operation 703. Thus, operation 703 has protected the data set from statistical attacks through the commutative encryption by the other parties.

In a following distribution operation 1003 the resulting data set is distributed to every party that is eligible for matching, that is, to a specified subset of all parties. The resulting data set being distributed is the respective data set that has been commutatively encrypted by all parties and, if applicable, on which the de-pre-encryption operation 1001 and the inverse mapping operation 1002 have been performed. According to an embodiment of the invention in case of the centrally coordinated scheme only the central coordinator C may be eligible for matching, but not the parties themselves. The distribution operation 1003 is performed for all commutatively encrypted data sets. After the distribution operation, the parties eligible for matching and/or the central coordinator C have copies of the commutatively encrypted data sets that they may use for comparison and matching.

In other words, during the distribution operation 1003 the data sets that have been commutatively encrypted by every party are distributed to all parties that are eligible to do matching and/or the central coordinator. Who receives what data sets can be agreed upfront. The distribution operation 1003 may comprise the sending of the encrypted data set of a party $P_i$ to all eligible parties according to the pre-specified policy by the central coordinator in the centrally-coordinated case. In the round-robin case of communication party $P_{b_n}$ sends the encrypted data set to $P_{b_1}$, and then for all $j \in 1 \ldots n-2$, $P_j$ sends the data set to $P_{j+1}$. This order can be different from the order used during the encryption.

The central coordinator can enforce the distribution policy by distributing the encrypted data sets to the appropriate parties.

In a following main matching operation 1004 a matching is performed on the encrypted data items. The main matching operation 1004 operates on the encrypted data items of the data sets of a subset of the involved parties. The main matching operation 1004 basically builds on the idea that bit representations of encrypted data items from (different) encrypted data sets HASH(DB$_i$) and HASH(DB$_j$) are equal if and only if the corresponding plaintext items are equal. This is guaranteed by the commutativity property of the applied encryption scheme. A match defines a set of matching data records in multiple data sets.

In case the optional identifier encryption operation 903 has been executed, the matching results in a set of data records whose identifiers ID are encrypted.

If a two-way encryption scheme has been used for the commutative encryption, the matching results in data records where the encrypted data items can be directly resolved without the need to refer to their encrypted identifiers IDs. Though, data records can also be resolved using the encrypted identifiers ID.

Each party who has obtained encrypted data sets in the distribution operation 1003 can perform matching on all those obtained data sets. This allows for the enforcement of a matching policy that defines the data sets a party may use for matching.

Figure 11A:
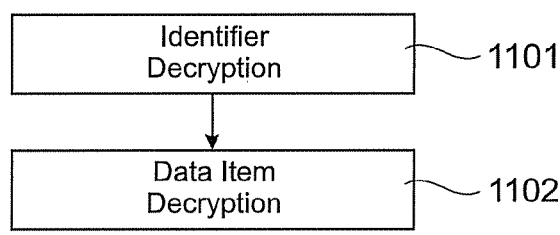
FIG. 11a illustrates a flow chart of exemplary embodiments of resolving operations.

FIG. 11a illustrates an exemplary embodiment of the resolving operations 604 in more detail.

The resolving operations, also denoted as resolution operations, allow a party that has received data sets for matching to obtain the plaintext data items of the data records. This can involve getting plaintext data items from their local data sets and/or from remote data sets. Subsets of data records can be resolved as well as full records.

The resolving operations may be executed for each data record that a matching party would like to resolve, that is, a subset of the data records of a match.

The communication between the parties during the resolving operations may be executed using a centrally coordinated scheme or a round-robin scheme with all or only some parties in the sequence of parties. The resolving of each data record may involve a different data set owner to do the resolving with.

If the identifier encryption operation 903 has been executed, an identifier decryption operation 1101 is provided. This identifier decryption operation 1101 allows for quantitative control by a defined subset of the parties over the resolved identities.

The matching party may get the identifier ID of a matching data record to be resolved decrypted by the parties who have encrypted it during the identifier encryption operation 903. The parties use their private key sk$_i$ of their public/private encryption key pair (pk$_i$, sk$_i$) for the decryption. The public/private encryption key pair (pk$_i$, sk$_i$) should be kept secret by the parties. In other words, the identifier decryption operation is performed by subsequent decryption by each of the parties who have encrypted it in the identifier encryption operation 903. Finally, the decrypted identifier ID is obtained by the data set owner for the record at hand. The data set owner may provide the requested data record information back to the matching party.

This approach allows for quantitative control over the identity resolution in terms of every involved party knowing how many identity resolutions are being done. This prevents excessive resolving.

A data item resolving operation 1102 performs the resolving, also denoted as resolution, of data items by means of a data set or database lookup using the identifiers ID of matching data records. The data set lookup can be done on both local and remote data sets DB$_j$ containing the plaintext data items.

The data item resolving operation 1102 may include local identity resolution, i.e., identity resolution by means of plaintext data sets locally stored at the matching party. The data item resolving operation 1102 may further include remote identity resolution, i.e., identity resolution by means of requesting the identity resolution from the remote data set owners of the respective matching data records. If a matching data record is from a data set DB$_j$, P$_j$'s data set has to be used for resolution. P$_j$ can be the party itself or another party. A resolution request is sent from the matcher to P$_j$ and contains the identifier (ID) field of a data record for addressing the requested data record. Requests and responses in the resolving phase can be encrypted with encryption keys of the data set owner and the matching party. The data item resolving operation 1102 allows for quantitative control over the remote resolution, but there is no quantitative control through the other parties over the local resolution.

Figure 11B:
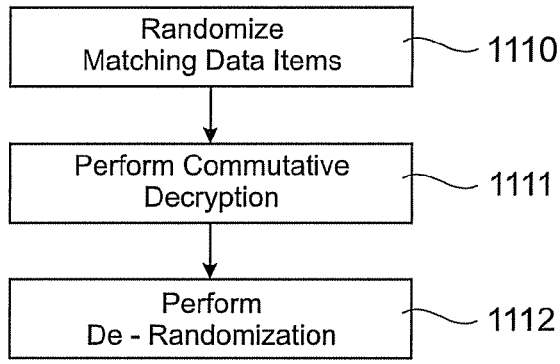
FIG. 11b illustrates a further flow chart of exemplary embodiments of resolving operations.

FIG. 11b illustrates another exemplary embodiment of the resolving operations 604 in more detail.

For this embodiment of the invention it is assumed that the identifier encryption operation 903 has been executed and the commutative encryption function is a commutative two way encryption function. This allows that data items can be resolved without the data set owner learning the data items or the data records they belong to. This results in an improved private resolving scheme and a quantitative control over the resolving process by a subset of the parties.

According to this embodiment each encrypted data item used in the matching process is a ciphertext resulting from commutative encryption by all parties.

In a randomizing operation 1110 the encrypted data item to be resolved is randomized by the matching party. Then a commutative decryption operation 1111 is performed by the party P$_j$ using their decryption key ŝ$_j$. All parties P$_j$ perform this commutative decryption operation in a defined order. The data set owner does not learn the data item being resolved, but only a randomized data item that conveys no information on the data item. The randomized and decrypted data item is provided back to the matching party. This can involve encryption with any encryption scheme with a publicly known encryption key pk'$_m$ of the matching party P$_m$. The matching party performs a de-randomization operation 1112 and de-randomizes the randomized data item (after potential decryption with its private decryption key sk$_{P_m}$) to obtain the plaintext data item.

In the following some mathematical details with respect to the features of the two way commutative encryption functions according to this embodiment of the invention are given. Exponentiation modulo a prime p is used as keyed commutative encryption function: $H_{s_i}(m) := m^{s_i}$ mod p. p is chosen such that a prime q with q|p−1 is the order of a cyclic subgroup of $Z^*_p$. All computations are performed modulo p resulting in subgroups having sufficiently large order with overwhelming probability.

As the function $H_{s_i}$ is defined as $H_{s_i}(u) := u^{s_i}$ mod p, when each party applies her function $H_{s_i}(\cdot)$ on input $u_{i-1}$ as follows $u_i := H_{s_i}(u_{i-1}) := u_{i-1}^{s_i}$ mod p, the final result is $$u_1^{\prod_{s_i \in \{1,\ldots,n\}} s_i} \bmod p.$$

Furthermore, the commutative two way encryption could be combined with a further obfuscation and the further obfuscation could be a function that performs an additional one way encryption.

Using the commutative two way encryption function as outlined above allows for a randomized decryption function to be used for the identity resolution. The identity resolution by randomizing the commutatively encrypted data item x=HASH($m_{i,j,k}$) and then getting it decrypted by all parties that have encrypted may proceed as follows:

The matcher or matching party chooses $r_1, r_2 \in [0; q-1]$, computes u:=$g^{r_1}$ x mod p and $\bar{u}$:=$g^{r_2}$ mod p and sends u and $\bar{u}$ to the next party in the sequence β.

Every party $P_{b_i}$ in the sequence then computes $u_{b_i}$ and $\hat{u}_{b_i}$ as follows and sends the computed values on to $$P_{b_{i-1}} : u_{b_i} := u_{b_i+1}^{1/s_{b_i}} \mod p$$

and $$\hat{u}_{b_i} := \hat{u}_{b_i+1}^{1/s_{b_i}} \mod p.$$

Note that $1/s_{b_i}$ is the decryption key $\hat{s}_{b_i}$.

The last party in the sequence sends the resulting values $u_{b_1}, \hat{u}_{b_1}$ back to the matcher.

The matcher computes the message m as m:=$u_{b_1}/\hat{u}_{b_1} g^{r_2/r_1}$ mod p. This gives the intended result m, the resolved data item to the matcher.

According to an embodiment of the invention $X_p$ is assumed to be a cryptographically secure hash function with the range $Z_p$ and it is further assumed that the data set owner preprocesses a data item by computing $X_p(m_{i,x,l})$. This reduces the size of p that would otherwise be big enough to allow for any data item m to be represented as an element p.

It should be noted that for optional operations different options may be taken for the processing of the data sets of different parties. The options should not be taken arbitrarily, but within constraints such that the security and privacy properties are retained. For example, if only one party is a matcher with particularly stringent secrecy requirements for their data set, the data item uniqueness transformation operation 703 and the inverse data item uniqueness transformation operation 1002 may be applied for the data set of this party, but not for the other data sets. This data set in encrypted form can still be used for matching it against the other encrypted data sets to which operations 703 and 1002 have not been applied.

Any disclosed embodiment may be combined with one or several of the other embodiments shown and/or described. This is also possible for one or more features of the embodiments.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computer implemented method for performing a privacy enhanced comparison of a plurality of data sets, the method comprising:
    allocating a private encryption key to each of the data sets;
    performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and
    comparing the commutatively encrypted data sets.

2. The method according to claim 1, wherein the data sets comprise data records and the data records comprise an identifier and one or more data items allocated to the identifier, and wherein the commutatively encrypted data sets are generated by successively applying the keyed commutative encryption function on the data items of the respective data set.

3. The method according claim 2, wherein the encryption operation for each of the data sets further comprises:
    generating a first encrypted data set by means of applying the keyed commutative encryption function on the respective data set with the private encryption key of the respective data set;
    generating a second encrypted data set by means of applying the keyed commutative encryption function on the first encrypted data set with the private encryption key of one of the other data sets;
    generating further encrypted data sets by means of successively applying the keyed commutative encryption function on the respective previously encrypted data set with the private encryption keys of one of the remaining data sets until the private encryption keys of all data sets have been utilized.

4. The method according to claim 1, wherein the data sets are allocated to two or more parties and the encryption is performed between the parties in a round-robin scheme, wherein each of the parties performs the following:
    applying the keyed commutative encryption function with its own private encryption key on its own plaintext data set and on encrypted data sets received from one of the other parties;
    forwarding the encrypted data sets to one of the other parties.

5. The method according to claim 1, wherein the data sets are allocated to two or more parties and wherein the encryption is controlled by a coordinator, the coordinator configured for:
    receiving commutatively encrypted data sets from the parties; and
    forwarding the commutatively encrypted data sets for further encryption to the other parties until each party has applied the keyed commutative encryption function with its private encryption key on each data set.

6. The method according to claim 1, wherein the commutative encryption function is a one way commutative encryption function.

7. The method according to claim 1, wherein the commutative encryption function is a two way commutative encryption function.

8. The method according to claim 2, further comprising performing one or more pre-processing operations for the data records.

9. The method according to claim 8, wherein the one or more pre-processing operations for the data records further comprises transforming data records of one or more formats in a standardized comparison format.

10. The method according to claim 8, wherein the one or more pre-processing operations for the data records further comprises adding noise to one or more of the plurality of data sets.

11. The method according to claim 8, wherein the one or more pre-processing operations for the data records further comprises performing a data item uniqueness transformation to one or more of the data sets.

12. The method according to claim 8, wherein the one or more pre-processing operations for the data records further comprises performing a pre-encryption of one or more data sets by means of generating a pre-encrypted data set of the respective data set, wherein the pre-encrypted data set is generated by applying the keyed commutative encryption function on the respective data set with a second private encryption key of the respective data set.

13. The method according to claim 12, further comprising, for one or more of the data sets, performing an identifier encryption operation for encrypting the identifiers of the data records by means of a two way encryption scheme.

14. The method according to claim 11, further comprising performing an inverse transformation of the data item uniqueness transformation after the respective data set has been commutatively encrypted by all parties.

15. The method according to claim 12, further comprising a decryption of the pre-encryption after the respective data set has been commutatively encrypted by all parties.

16. The method according to claim 1, further comprising a performing distribution operation for distributing one or more of the commutatively encrypted data sets to a predefined number of parties eligible for matching.

17. The method according to claim 1, further comprising performing a matching operation for comparing one or more of the commutatively encrypted data sets for similar or identical data items.

18. The method according to claim 13, further comprising performing an identifier decryption operation for decrypting the encrypted identifier of a matching data record.

19. The method according to claim 1, further comprising performing a data item resolving operation for resolving the identities of matching commutatively encrypted data items.

20. The method according to claim 19, wherein the data item resolving operation further comprises looking up the plaintext entries of the matching commutatively encrypted data items by means of identifiers allocated to the respective data items.

21. The method according to claim 19, wherein the data item resolving operation further comprises:
   a randomizing operation for randomizing an encrypted data item to be resolved by a party eligible for resolving;
   a commutative decryption operation performed by all parties having been involved in the commutative encryption for commutatively decrypting the randomized encrypted data item by means of their private decryption keys; and
   a de-randomizing operation by the party eligible for resolving.

22. A computer implemented method for performing a privacy enhanced comparison of a plurality of data sets and commutatively encrypting the data sets, the method comprising:
   allocating a private encryption key to each of the data sets;
   performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and
   wherein the comparison is performed by means of the commutatively encrypted data sets.

23. A program product comprising computer readable instructions that, when executed by a computer, implement a method of performing a privacy enhanced comparison of a plurality of data sets, the method further comprising:
   allocating a private encryption key to each of the data sets;
   performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and
   comparing the commutatively encrypted data sets.

24. A computer system, comprising:
   a processor;
   a memory device in communication with the processor; and
   a comparison system in communication with the memory device, the comparison system configured to perform a privacy enhanced comparison of a plurality of data sets, the privacy enhanced comparison further comprising:
   allocating a private encryption key to each of the data sets;
   performing an encryption operation for each of the data sets, the encryption operation comprising generating a commutatively encrypted data set of the respective data set, wherein the commutatively encrypted data sets are generated by successively applying a keyed commutative encryption function on the respective data set with the private encryption key of the respective data set itself and with the private encryption keys of the other data sets; and
   wherein the comparison is performed by means of the commutatively encrypted data sets.

* * * * *